May 3, 1938.  J. MENSCHNER  2,115,822
MEASURING OF RUNNING WEBS
Filed Aug. 30, 1934  4 Sheets-Sheet 1
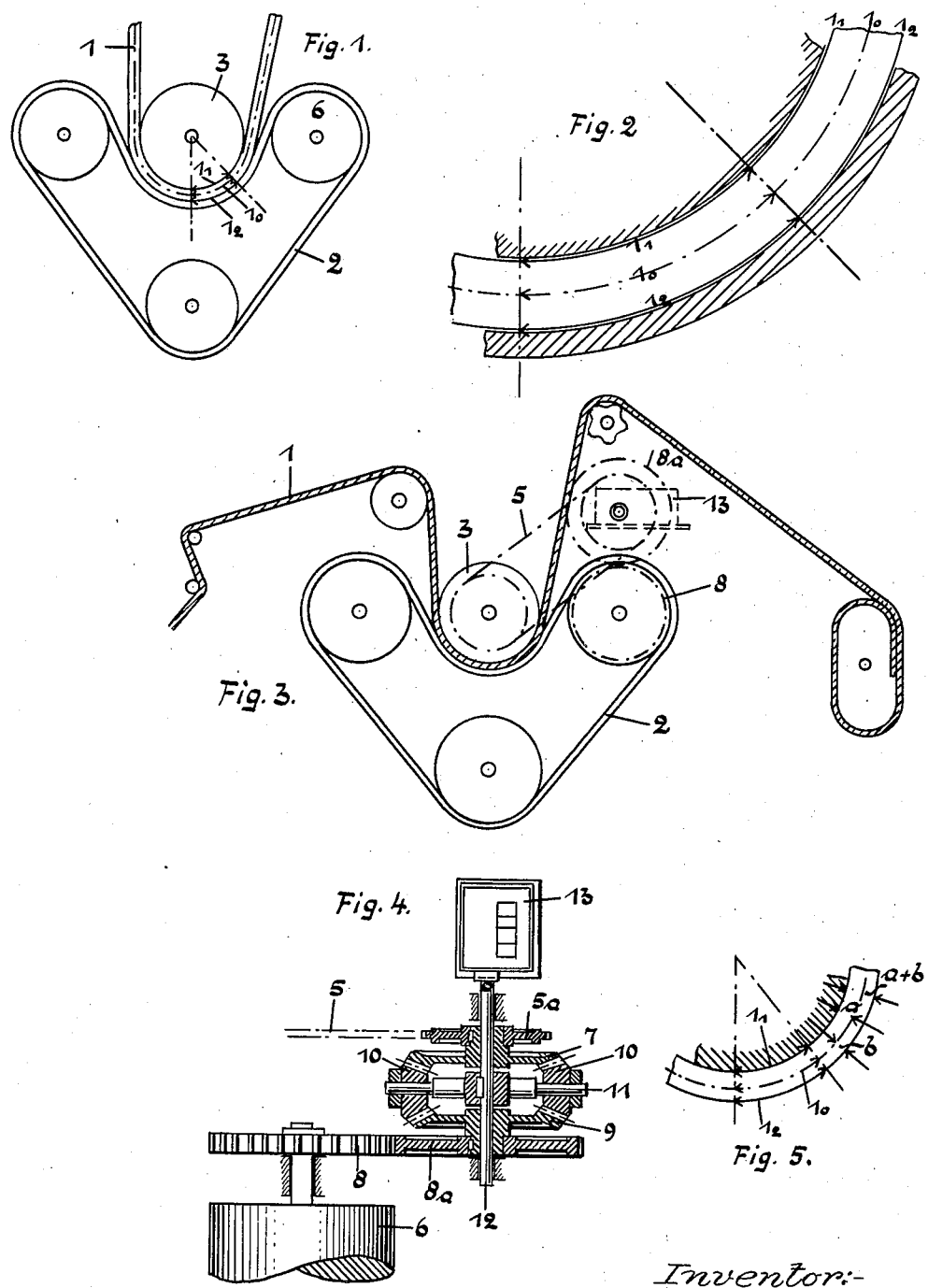

May 3, 1938.  J. MENSCHNER  2,115,822.
MEASURING OF RUNNING WEBS
Filed Aug. 30, 1934   4 Sheets-Sheet 2
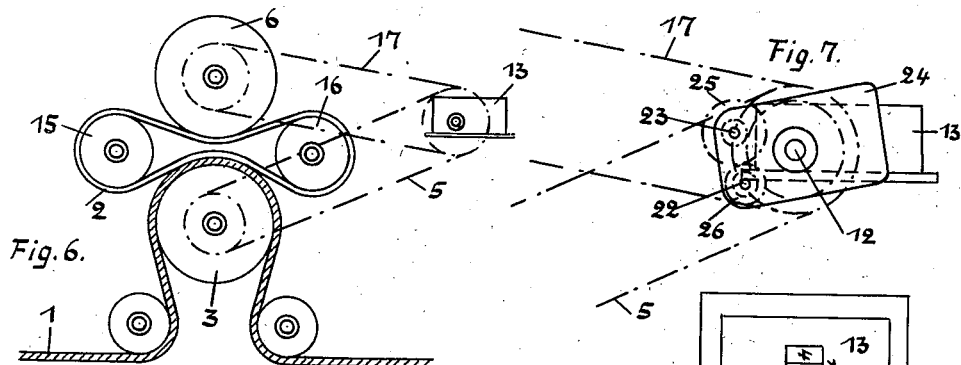
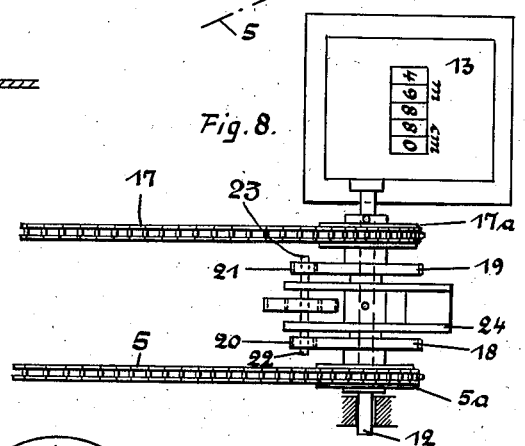
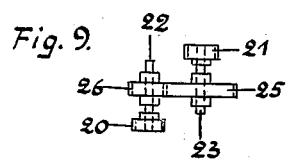
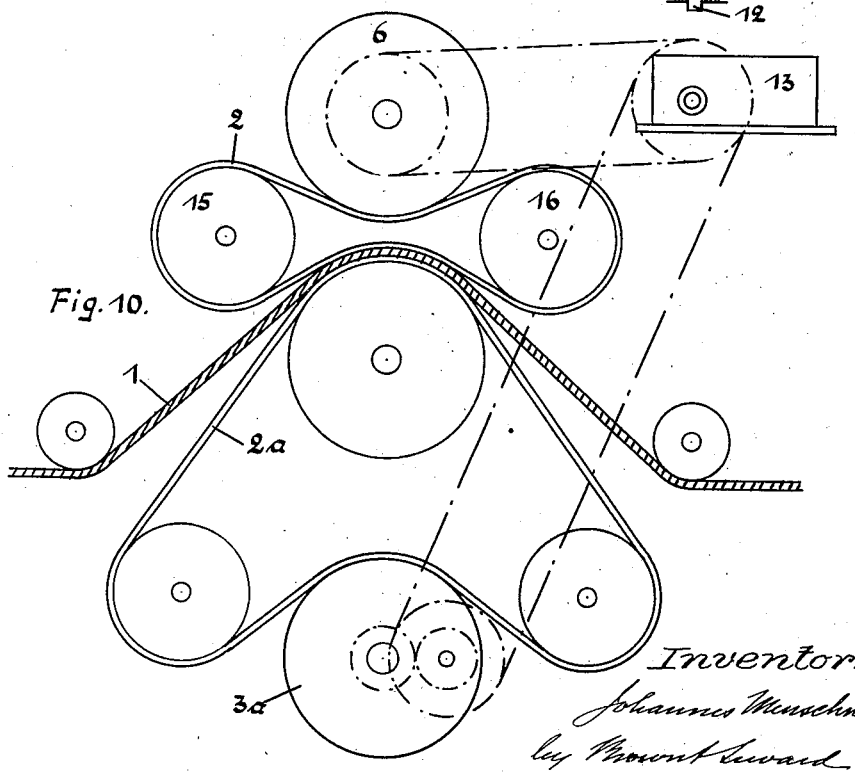
Inventor:-
Johannes Menschner
by Mount Seward

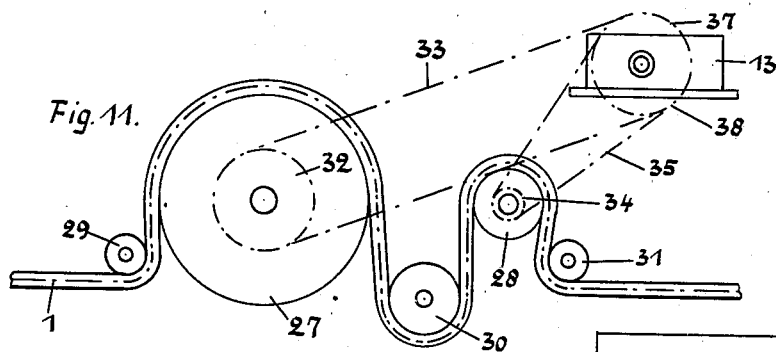
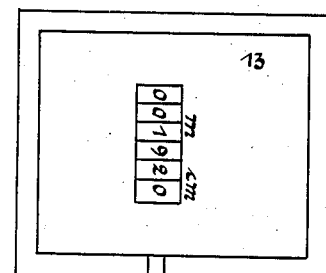
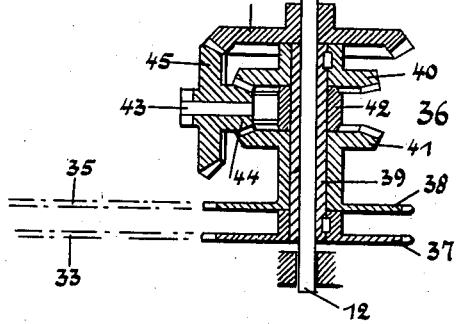
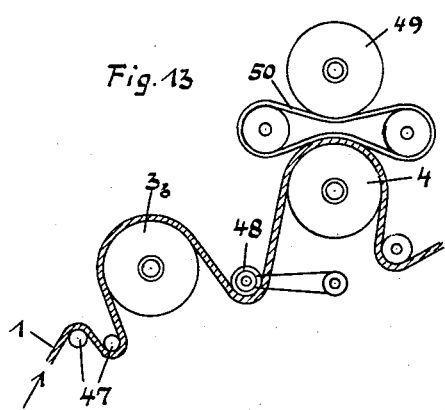
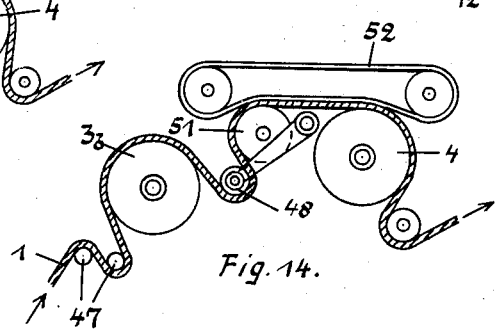

May 3, 1938.    J. MENSCHNER    2,115,822
MEASURING OF RUNNING WEBS
Filed Aug. 30, 1934    4 Sheets-Sheet 4

Inventor:-
Johannes Menschner

Patented May 3, 1938

2,115,822

UNITED STATES PATENT OFFICE 2,115,822

MEASURING OF RUNNING WEBS

Johannes Menschner, Rosswein, Germany

Application August 30, 1934, Serial No. 742,117
In Germany December 6, 1933

6 Claims. (Cl. 33—129)

This invention refers to the measuring of running webs and has for its object to provide improvements therein.

In accordance with this invention I provide a process and apparatus for measuring running webs, which consists in that the web is submitted in one continuous procedure to a pre-tension, the so tensioned or stretched web being untensioned or slackened to the proper state, in which it is used for commerce, viz: to the practically untensioned state, and led in this untensioned state over endless measuring means for measuring the running web under plane-like guidance. This measuring can take place under plane-like guidance on the upper and lower side or on the same side by means of two measuring rollers of different diameters arranged behind each other, in which case the two measuring results are reduced to a mean measurement corresponding to the measurement of the neutral plane of the web.

Thus the advantage is obtained that by ascertaining the two measuring lengths under plane-like guidance of the web and by reducing the ascertained measuring results to a mean measurement applicable to the neutral plane of the web, any mistake in measurement, particularly any mistakes due to the thickness of the web are avoided and the exact measurement for the neutral plane of the web is ascertained.

In the accompanying drawings various forms of measuring devices for carrying out the process according to this invention are illustrated by way of example.

A suitable apparatus for pre-tensioning the web to be measured and supplying it to the measuring device in a relatively untensioned or slackened condition is shown in applicant's co-pending application, Serial No. 730,277, filed June 12, 1934, and it will be understood that this apparatus or other similar devices might be used in connection with the mechanism shown and described herein.

Fig. 1 represents a diagrammatic end elevation of a machine using a measuring roll and a measuring band.

Fig. 2 represents an enlarged detail of a transverse vertical section of the sector between the radius lines of Fig. 1.

Fig. 3 represents a diagrammatic end elevation of a machine using a measuring roll and a measuring band, with a differential and counting device.

Fig. 4 represents an enlarged detail plan view partly in section of the differential and counting device of Fig. 3.

Fig. 5 represents diagrammatically an enlarged detail of a sector of a measuring roll in contact with a web.

Fig. 6 represents a diagrammatic end elevation of a machine using a measuring roll and a measuring band, the distance of travel of the band being measured by a roll pressing against its contact surface, and a differential and counting device.

Fig. 7 represents a diagrammatic end elevation of the differential and counting device of Fig. 8 with the proportion wheels in a different position.

Fig. 8 represents a top plan view of a differential and counting device.

Fig. 9 represents an elevation of the proportion wheels of Fig. 8.

Fig. 10 represents a diagrammatic end elevation of a machine using two measuring bands and rolls operating against the contact surface of each band to measure the same through a differential and counting device.

Fig. 11 represents a diagrammatic end elevation of a machine using two measuring rolls of different diameters to measure the web by means of a differential and counting device.

Fig. 12 represents an enlarged top plan view of the differential and counting device of Fig. 11 showing the differential in section.

Fig. 13 represents a diagrammatic end elevation of a pretensioning device used in connection with the machine of Fig. 6.

Fig. 14 represents a diagrammatic end elevation of a machine combining the pretensioning device of Fig. 13, the measuring rolls of Fig. 11, and a band to enable accurate measurement of the last few feet of a web.

Figure 15:
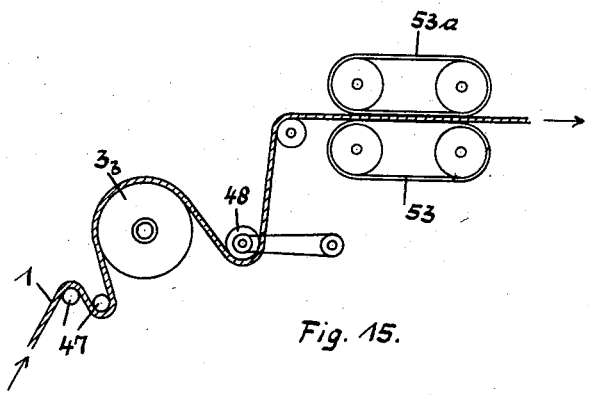
Fig. 15 represents a diagrammatic end elevation of a machine employing a pretensioned web and either one or two measuring bands in straight-line contact with the web.

As will be seen from Fig. 1 the running web 1 to be measured is guided between a measuring band 2 and a measuring roller 3. One side of the web 1 runs over the measuring roller 3, the other side abutting the measuring band 2. The web is guided over rolls in such a manner that by the measuring roller 3 the length of the puckered surface $l_1$ and by the endless measuring band 2 the length of the stretched surface $l_2$ of the running web 1 is transferred onto two counting devices and is measured. If it is assumed that the neutral plane of the material lies in the middle of the running web, there is found from the ascertained measured lengths of the puckered and of the stretched surface $l_1$, $l_2$ the arithmetic mean, which would produce the correct length, measured in the median line $l_0$ of the running web. The measured length run off by the endless measuring band 2 is ascertained by means of the roller 6, which is constructed as a measuring roller, and is transferred onto a counting device exactly in the same manner as takes place from the measuring roller 3 onto the counting device belonging thereto. The expression "longitudinally unstressed plane" is the equivalent of "neutral plane" and is used to designate that part of the web to be measured which, theoretically, is neither stretched nor compressed when the web is bent around a curved surface, as just explained in connection with the diagrammatic showing in Fig. 2.

Fig. 2 shows on an enlarged scale in what manner differences of length between the puckered surface $l_1$ and the stretched surface $l_2$ of the running web 1 occur if compared with the length in the median line $l_0$.

With the construction shown by way of example in Fig. 1 the measuring roller 3 can be suitably driven and the measuring band 2 can be driven by the running web 1, or vice versa.

From the ascertained lengths measured on the puckered and on the stretched surface, the arithmetic mean can either be found mathematically or directly ascertained by an automatic device.

In Figs. 3 and 4 by way of example, a mode of construction of the device is diagrammatically shown automatically and directly ascertaining the arithmetic mean.

As will be seen from these Figs. 3 and 4, there is interposed between the measuring roller 3 and the roller 6 for measuring the length of the discharged endless band a differential mechanism coupled with the counting device in such a manner that within this differential mechanism the arithmetic mean of the length measured by the measuring roller and of the length measured by the endless band are ascertained and transferred onto the counting device.

With this construction the length ascertained by the measuring roller 3 is transferred by means of the chain 5 onto the chain-wheel $5a$, freely rotating on the shaft 12, whereas the length ascertained by the measuring roller 6 is transferred by means of the cog-wheel 8 onto the cog-wheel $8a$, freely rotating on the shaft 12. The chain-wheel $5a$ and the cog-wheel $8a$ gear, by means of the bevel-wheels 7 and 9, with the revolving wheels 10, the axles 11 of which are connected by a member fixed to the shaft 12, said shaft being coupled with the counting device 13.

Experience has shown that, on measuring both sides of the web guided in a curved manner over the measuring device, the neutral plane of the fabric to be measured does not always coincide with the median line thereof, in other words, the neutral plane lies either nearer the curved inner web-surface or nearer the outer stretched web-surface. Such displacement of the neutral plane of the web 1 running in a curve will be found for instance with running webs of non-uniform structure, viz: with webs, the two fabric surfaces of which are uneven, for example with velour, roughened or plush-like fabrics, or with running webs which do not show a uniform structure because of difference in their binding or the like. Such displacement of the neutral plane has not only been found with the running web but also with the band for measuring said web.

According to the invention the definite measured length of the displaced neutral plane of the web under consideration is ascertained, not by taking the arithmetic mean for the measured lengths ascertained from both sides of the web, but by reducing the ascertained measured lengths to the length of the neutral plane of the material displaced from the median line, and this taking into consideration the distance of the neutral plane from the inner puckered web surface and from the outer stretched web surface.

In order to eliminate the mistakes produced by the measuring band and giving a wrong measuring result, the band is so arranged that it touches the web to be measured as well as the measuring roller with one and the same surface, so that the neutral plane resulting in the measuring band will always lie at the same distance from the measured web as from the measuring roller.

Fig. 5 shows a section through part of the measuring roller 3, over which the web 1 to be measured is curvedly guided. $l_0$ is the neutral plane of the material, which, as experience has shown, lies at a distance $a$ from the inner puckered web-surface $l_1$, and at a distance $b$ from the outer stretched web-surface $l_2$. By means of experiments already made it has been found that the distance of this neutral plane from the inner puckered web-surface $l_1$ and from the outer stretched web-surface $l_2$ are in a proportion of generally 2:1.

Fig. 6 shows diagrammatically a measuring device for eliminating the mistakes made by the measuring band and giving a wrong measuring result. For this purpose the measuring band 2 is guided round two rollers 15, 16 in such a manner that the measuring band which is curved between said rollers, comes into contact with the web 1 running over the measuring roller 3 as well as with the measuring roller 6, viz: that the measuring band 2 will make contact with the same surface with the web 1 during its passage over the measuring roller 3, as with its measuring roller 6, and that the displaced neutral plane in the measuring band will lie at the same distance from the surface of the web, as from the surface of its measuring roller. Thus the mistake, which would arise through the displaced plane is eliminated.

The measuring roller 3 can be power driven and the measuring band 2 can be arranged to run freely. The measuring band 2 can be power-driven and the measuring roller 3 can be arranged to rotate freely, or it is also possible to have the measuring band 2 as well as the measuring roller 3 driven by the running web.

As will be seen from Fig. 6 a counting device 13 is provided which is connected with the measuring roller 3 by means of a chain-drive 5, and with the measuring roller 6 by the chain-drive 17.

In Fig. 8 there are shown the chain-wheels $17a$ and $5a$, driven by the chains 5 and 17, each of said wheels being in driving connection with the central wheels 18, 19, and turning loosely around the shaft 12, the driving shaft for the counting device 13. The wheels 18 and 19 co-act with the turning wheels 20 and 21, the axles 22 and 23 of which are mounted in the planet-wheel-bearing 24. On the axles 22 and 23 there are seated the proportion wheels 25 and 26, belonging to the differential mechanism and meshing with each other, see Figs. 7 and 9, in which the number of teeth is so selected that the ascertained measured lengths are calculated in accordance with the proportion of the distances of the neutral plane of the material being measured to the inner and outer web-surfaces.

As Fig. 10 shows, without departing from the scope of the invention, instead of the measuring roller 6 an endless measuring band 2a can also be used, the band being guided over correspondingly mounted rollers and acting on the measuring device 13 by means of a measuring roller 3a.

According to the above described measuring devices the running web is measured on both sides in arcs. The correct length-measurement for the displaced neutral plane may also be effected by measuring one web-surface in such a manner that a number of measuring rollers of different circumferences or diameters are arranged in series, over which rollers the web is guided in a curve. From the proportion of the circumferences or diameters of the measuring rollers to each other, and from the difference of the measuring results the correct final result can be ascertained.

A measuring device of this kind is shown in Fig. 11, by which it will be seen that 27 is the larger measuring-roller and 28 is the smaller measuring-roller, over which the web 1 is guided with different radii of curvature. 29, 30 and 31 are guiding rollers. The measuring rollers 27 and 28 act by means of the chain-wheel 32 and chain 33 and by means of the chain-wheel 34 and chain 35 on a differential mechanism connected with the counting device 13.

As will be seen from Fig. 12 the counting-device 13 is provided with a shaft 12, on which the differential mechanism 36 as well as the chain-wheels 37 and 38 are mounted. The chain-wheel 37 is keyed or firmly connected to the sleeve 39, on which the central-wheel 40 is also keyed. The chain-wheel 38 is connected to the central wheel 41. The revolving wheel 44 rotates within the bearing or support 42, carrying the pin 43, said bearing for the revolving wheel rotating in a known manner around the axle 12. The revolving bevel wheel 44 is rigidly connected with the multiplying bevel wheel 45, which meshes with a third central wheel 46 firmly connected to the axle 12. The gear ratio of the wheel 45 to the central wheel 46 is half as large as that of the revolving wheel 44 to the central wheel 40.

With the known proportion of the circumferences or diameters of the rollers to each other thus the unknown error resulting from the thickness of the web can be ascertained and corrected as follows:

If the circumferences or diameters of the two measuring rollers are in a proportion 1:3, the difference in lengths between the two measured lengths as ascertained by the larger and smaller measuring rollers must be halved. This ascertained halved difference in length is then added to the length measured by the larger roller, so that this final result is the true length as it would be measured in the neutral plane.

Naturally the ascertained halved difference in length may, with the measuring rollers in the proportion 1:3, be multiplied by three and thus added to the length measured by the smaller measuring roller.

If the proportion of the two measuring rollers is for instance 1:4, the ascertained difference in length must be first of all divided into three and the third thus obtained must then be added to the length measured by the larger measuring roller, or its quadruplicate must be added to the length measured by the smaller measuring roller.

The divisor for dividing the ascertained difference in length is always found by subtracting the numerator from the denominator of that fraction which forms the proportion of the circumferences or diameters of the measuring rollers to each other.

Instead of measuring rollers making contact directly with the web, measuring bands can be used, from which the measurements can be taken off by means of measuring wheels.

The measuring rollers can be driven by the running web, or one measuring roller can be power-driven and the web may be driven by this driven measuring roller.

In order to eliminate any measuring error resulting from the supply of the web in a condition not generally used for sale or commerce, viz: in a not practically untensioned condition, the above described measuring devices may be used for a process, in which the running web is submitted in one continuous procedure to a pretension, and the so tensioned or stretched web is slackened by making the rapidity of its supply greater than the rapidity with which it is drawn off or discharged. Through regulating the rapidity of supply the slackened web is brought to the proper state in which it is used for commerce, viz: to a practically untensioned condition, held in this state and measured during the same under planelike guidance.

In Fig. 13 there is shown by way of diagram a measuring device for carrying out the above process. 1 is the running web, 47 is a device for pretensioning the web consisting of guiding rods. 3$^b$ is the supply-roller. 48 is the weight-roller, the weight of which is selected in such a manner that the slackened web is brought into a state, in which it is generally used in commerce, which means the practically untensioned state of the fabric ready for sale, after it is finished. At the same time by means of this weight-roller any fluttering in the movement of the web when running onto the measuring device is avoided and an even run of the web without the formation of any puckering or plaits is ensured. Said weight-roller is either connected with the supply-roller or with the draw roller for the purpose of regulating the circumferential speed. 4 is the draw-roller, which is at the same time constructed as a measuring roller. 49 is a measuring roller disposed above the roller 4. Between these two measuring rollers there passes an endless band 50, the arrangement being similar to that shown in Fig. 6. By means of this device the web is pretensioned, slackened, kept under tension in the usual state for sale, viz: in a practically untensioned state, and measured in this state under planelike guidance.

In Fig. 14 there is diagrammatically shown a further construction of this measuring device for carrying out the measuring process. 1 is the web, 47 is a device for pretensioning the web, 3$^b$ is the supply-roller, 48 is the weight-roller, 51 and 4 the two measuring rollers of different diameters arranged in series. Thus it will be seen that the web is first tensioned or stretched, then slackened by means of the supply-roller 3, then again held tensioned by means of the weight roller 48 in the proper state for sale, viz: in the practically untensioned state, and finally measured under this tension by the measuring rollers 51, 4, under planelike guidance.

In order to effect the measurement of the web 1 also up to the very end of the fabric in an exact manner, according to Fig. 14 an endless band 52 is disposed over both rollers 51, 4. The larger measuring roller 4 is power-driven and drives the smaller measuring roller 51 by means of the endless pressure-band 52. Through the endless band 52, lying on the smaller measuring-roller 51, the advantage is obtained that the web will up to the very end lie in close contact with the smaller measuring roller 51, thus avoiding any measuring error in connection with this roller. Furthermore the advantage is also obtained that after the web leaves the smaller measure-roller 51 the latter will be further rotated with the same circumferential speed by means of the larger measure-roller 4 until the measuring procedure is finished.

Figure 16:
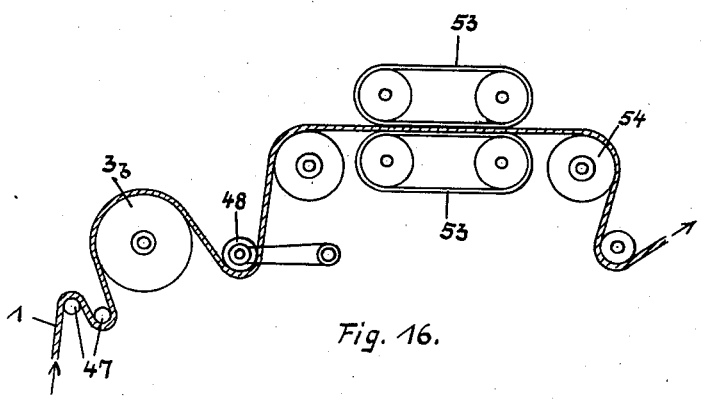
Fig. 16 represents a diagrammatic end elevation of a machine according to Fig. 15 showing a draw-off roller.

Figs. 15 and 16 show a mode of construction, in which the surface-like measuring of the web takes place in a plane, viz: non-curved state, inasmuch as the web is passed between two endless bands effecting the measuring.

With the mode of construction shown in Fig. 15 only the endless band 53 is the measuring band, whereas the other endless band 53a is the guiding- or transport-band. The running speed of the measuring band 53 may be the same as the usual circumferential speed of the draw-off roller, viz: the running speed of the measuring band must be in a defined proportion to the supply-roller. The two endless bands 53, 53a may also be measuring bands if this is required by the running web and by the circumstances, viz: if the running web is in consequence of the unevenness of the web-surfaces measured from both sides.

With the mode of construction shown in Fig. 16 the endless bands 53 are only measuring bands, and there are before and behind the endless bands further arranged two rollers of the same diameter, of which the back roller 54 is the draw-off roller.

What I claim is:

1. An apparatus for the longitudinal measurement of running webs comprising, a measuring roller, an endless measuring band, and a second measuring roller in contact with said endless measuring band, means for guiding the web to be measured along a curved path between said first mentioned measuring roller and the surface of the endless measuring band, measuring means operatively connected with each of said measuring surfaces, and differential mechanism connecting both said measuring means with a single counting device.

2. An apparatus for the longitudinal measurement of running webs comprising, two endless movable measuring surfaces adapted to make contact with the web over appreciable areas, said measuring surfaces comprising two rollers of different diameters arranged to act in series on one surface of the material, measuring means operatively connected with each of said measuring surfaces, and differential mechanism connecting both said measuring means with a single counting device.

3. An apparatus for the longitudinal measurement of running webs comprising, an endless movable measuring band adapted to make contact with the web over an appreciable area, said band being supported on rollers of different diameters and arranged to be driven by contact with the web to be measured, measuring means operatively connected with each of said rollers, and differential mechanism connecting both said measuring means with a single counting device.

4. An apparatus according to claim 1 wherein the second measuring roller contacts the same side of the surface of the endless band as does the web.

5. An apparatus according to claim 1 wherein between the measuring roller and the endless measuring band, there are: a second endless band adapted to contact the web, a roller adapted to keep both endless bands and the web in close contact, and means adapted to keep the second endless band in contact with the measuring roller.

6. An apparatus for the longitudinal measurement of running webs in a substantially untensioned condition comprising, two endless movable measuring surfaces adapted to make contact with the web over appreciable areas simultaneously, means for guiding the web over said surfaces in a curved condition, and measuring means including said surfaces and applicable to two surface areas of the web arranged to give two distinct length measurements, whereby the length of the neutral plane of the web can be obtained or calculated, the endless movable measuring surfaces comprising two rollers of different diameters arranged to act in series on different parts of one surface of the material.

JOHANNES MENSCHNER.